United States Patent [19]

Tate et al.

[11] Patent Number: 4,735,400

[45] Date of Patent: Apr. 5, 1988

[54] PLUG FOR A REFINING APPARATUS

[75] Inventors: Masahisa Tate, Yokohama; Makoto Watanabe, Tokyo; Hideaki Nishio, Okayama; Junji Onmyoji, Oku; Eiji Yokogi, Bizen; Hiroaki Shimizu, Bizen; Kuniaki Miyamaoto, Bizen; Koichiro Kishita, Wake; Masakatsu Tsutsui, Himeji, all of Japan

[73] Assignees: Toshin Steel Co., Ltd.; Shinagawa Refractories Co., Ltd., both of Tokyo, Japan

[21] Appl. No.: 27,277

[22] Filed: Mar. 17, 1987

[30] Foreign Application Priority Data

| | | |
|---|---|---|
| Mar. 28, 1986 [JP] | Japan | 61-70569 |
| Mar. 28, 1986 [JP] | Japan | 61-70570 |
| Jun. 30, 1986 [JP] | Japan | 61-153597 |
| Jun. 30, 1986 [JP] | Japan | 61-99968[U] |
| Aug. 5, 1986 [JP] | Japan | 61-120062[U] |
| Nov. 10, 1986 [JP] | Japan | 61-171275[U] |

[51] Int. Cl.[4] ............................................. C21C 5/48
[52] U.S. Cl. ........................................ 266/266; 266/270; 373/95; 373/146
[58] Field of Search .............. 266/218, 220, 265, 266, 266/270; 373/85, 116, 146

[56] References Cited

FOREIGN PATENT DOCUMENTS

| | | | |
|---|---|---|---|
| 2525755 | 10/1983 | France | 266/218 |
| 103108 | 6/1985 | Japan | 266/218 |

*Primary Examiner*—L. DeWayne Rutledge
*Assistant Examiner*—Robert L. McDowell
*Attorney, Agent, or Firm*—Frank J. Jordan; C. Bruce Hamburg; Manabu Kanesaka

[57] ABSTRACT

A plug comprises a refractory body having a plurality of gas passgeways through which gas is blown into a refining apparatus. Each gas passageway may be defined by at least two metal tubes which are longitudinally spaced apart from each other. Alternatively, each gas passageway may be at least partly defined by an electrically insulating tube. The plug may alternatively have a plurality of gas passageways each having a bare refractory wall, while the body is reinforced with non-conductive mineral fibers, or metal wires which do not continuously extend throughout the plug. The plug may further be provided with a plurality of elongated holes extending in parallel to the gas passgeways from the inner surface of the body facing the interior of the refining apparatus to an intermediate portion thereof.

19 Claims, 18 Drawing Sheets

FIG. 6
FIG. 7
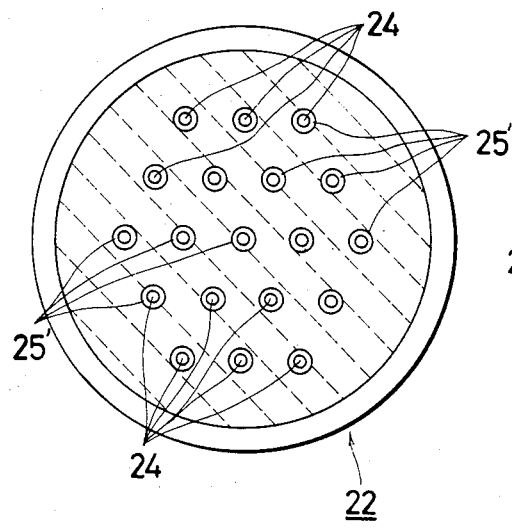
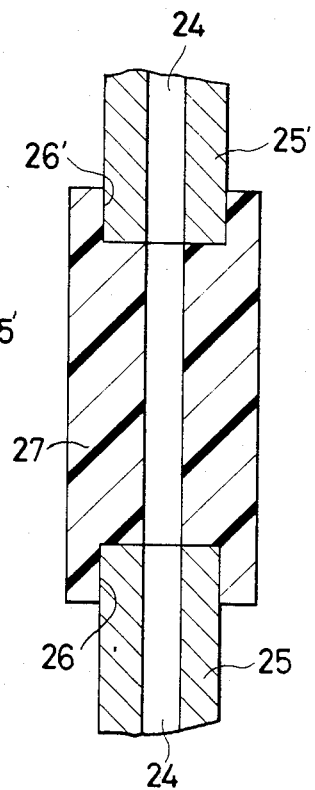

FIG.16
FIG.17
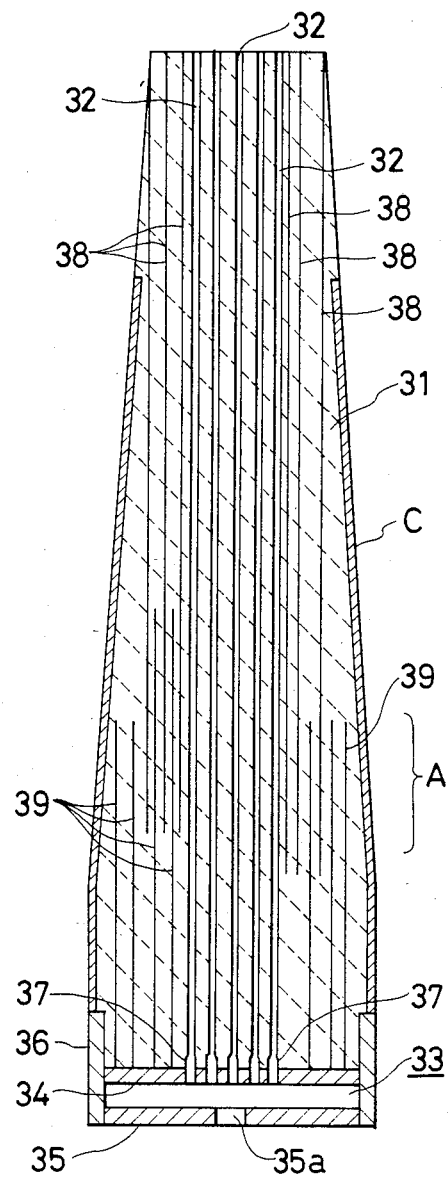
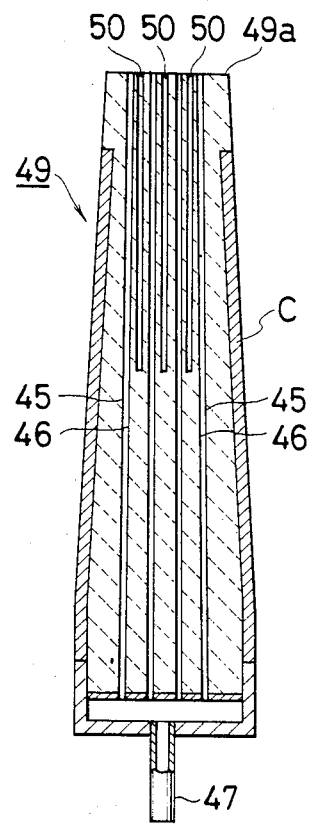

PLUG FOR A REFINING APPARATUS

FIELD OF THE INVENTION AND RELATED ART STATEMENT

This invention relates to an apparatus for refining a molten metal. More particularly, it relates to a plug which is provided at the bottom of a refining apparatus for blowing gas thereinto.

An apparatus for refining a molten metal, such as a converter, usually has at its bottom a refractory plug through which various kinds of gases are blown into the molten metal for stirring it to promote its decarbonization or reaction. The plug usually comprises a refractory body having a plurality of longitudinally extending gas passageways and a housing provided at the outer end of the body and defining a gas distributing chamber connected to the gas passageways. Gas is blown into the molten metal through the gas distributing chamber and passageways. Each gas passageway is usually provided with a thin metal tube. The metal tubes reinforce the plug and prevent the deterioration of the refractory material by gas. For example, they prevent the oxidation resulting from the contact of oxygen in gas with carbon in magnesia-carbon (MgO-C) bricks.

In an electric steelmaking furnace, the charge is heated by an induction coil or melted by arc and an induction current flows through the molten charge. This current is likely to reach the exterior of the furnace through the metal tubes in the plug and thereby have an adverse effect on its operation.

The plug which is provided at the bottom of an electric furnace is preferably formed from refractories of the highest quality which are not easily worn. The plug, however, gets worn at an average rate of 0.2 to 0.5 mm per heat even if it may be made of refractories of the highest quality and used under favorable conditions.

A metal or slag often adheres to the bottom of an electric furnace and forms a protective layer for the refractories. The molten steel is often solidified at the bottom of an electric furnace to form a mushroom-shaped metal layer covering the upper or inner surface of the plug and its vicinity. This metal layer protects the surfaces of the plug and the surrounding bottom wall portions of the furnace against damage by the molten steel which is strongly stirred by the gas which is blown through the plug. No stable metal layer is, however, easily formed on the plug, as it has widely varying temperature.

A dry stamping masterial is usually used for constructing the refractory bottom wall of an electric furnace in order to improve the working environment and shorten the time required for its construction. The hearth which is formed from a stamping material consisting mainly of MgO usually has a life of one to two years when the furnace is used for 10 to 20 heats a day. The hearth is protected by a metal or slag layer which is formed thereon, and hardly decreases its thickness even if a period of one or two years has passed after its construction.

No protective metal layer is, however, formed easily on the plug because of its widely varying temperature, but it gets worn at a rate of 0.2 to 0.5 mm per heat or even more rapidly. The plug, therefore, gets worn by a thickness of 100 to 250 mm or even a greater thickness when it is used for 500 heats. The wear of the plug promotes the wear of the surrounding stamping material, too, and the life of the hearth, which would otherwise last for one to two years, is drastically shortened.

SUMMARY OF THE INVENTION

It is an object of this invention to provide a plug which can advantageously be provided at the bottom of an electric furnace for blowing stirring gas thereinto.

It is another object of this invention to provide a plug and the hearth structure of an electric furnace which are excellent in durability.

According to one aspect of this invention, there is provided a plug having a plurality of gas passageways each provided with a plurality of metal tubes which are longitudinally spaced apart from each other.

According to another aspect of this invention, there is provided a plug having a plurality of gas passageways each provided with a tube having at least a portion which is formed from a nonconductive material.

According to still another aspect of this invention, there is provided a plug having a plurality of gas passageways each reinforced by a nonconductive mineral fiber and/or a metal wire which is not continuous longitudinally of the plug.

According to a further aspect of this invention, there is provided a plug having a plurality of gas passageways and a plurality of holes each provided between every two adjoining gas passageways and also extending from one end of the plug adapted for facing the interior of a furnace to a portion intermediating the ends thereof.

BRIEF DESCRIPTION OF THE DRAWINGS

FIG. 6 is an enlarged sectional view taken along the line VI—VI of FIG. 5;

FIG. 7 is an enlarged longitudinal sectional view of a portion of the plug shown in FIG. 5 in which an insulating tube is connected to conductive tubes;

FIGS. 14 to 19 are longitudinal sectional views of plugs according to further embodiments of this invention;

DETAILED DESCRIPTION OF THE INVENTION

Figure 1:
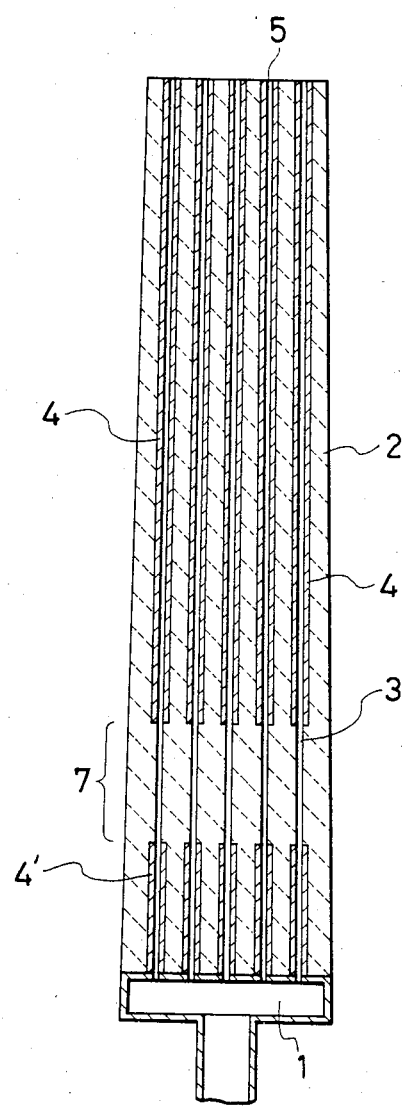
FIG. 1 is a longitudinal sectional view of a plug embodying this invention.

According to one aspect of this invention, there is provided a plug formed from a refractory material, such as MgO-C, provided in the bottom wall of an electric furnace for connecting a gas distributing chamber and the interior of the furnace and having a plurality of gas passageways each containing two relatively thin electrically conductive tubes which are longitudinally spaced apart from each other. Each of the tubes is formed from an electrically conductive material, such as stainless steel or any other metal, and has a relatively small inside diameter.

The plug can be manufactured by a method which will hereinafter be described by way of example. A plurality of tubes, of which the number corresponds to the number of the gas passageways to be made, are each cut in two segments defining an upper tube and a lower tube, respectively, and each having an appropriate length. The lower tubes are joined at one end to a housing defining a gas distributing chamber by an ordinary method, such as welding, screwing or caulking. A metal wire is passed through each of the lower tubes and one of the upper tubes to hold them in coaxial relation with each other. The wire has a diameter which is equal to the inside diameter of the tubes. The wire has a length which is considerably greater than the total length of the two tubes, so that the upper and lower tubes may be appropriately spaced apart from each other. Those ends of the upper tubes which are remote from the lower tubes are so arranged in appropriately spaced apart relation from one another that they may lie in a plane defining the end surface of a plug which will face the interior of a furnace. Then, the tubes are lined with a refractory material, such as MgO-C, MgO, MgO-$Cr_2O_3$, MgO-chromite or high alumina, so that a body having the shape of a plug in which the tubes are embedded may be formed. The wires are, then, removed to open the gas passageways.

Although it is desirable to employ as many tubes as possible to form the gas passageways which are located in close proximity to one another and can deliver gas over a large area, their number is limited from a manufacturing standpoint. If the tubes are arranged too close to one another, the refractory material fails to fill satisfactorily the spaces between the tubes and yields a plug having an undesirably low packing density and thereby an undesirably low degree of erosion resistance. If, on the other hand, too small a number of tubes are employed, the gas passageways are undesirably widely spaced apart from one another. Therefore, every two adjoining tubes should be spaced apart from each other by a distance of at least dozens of millimeters so that the space therebetween may be satisfactorily filled with the refractory material including coarse particles.

The upper and lower tubes defining each gas passageway are spaced apart from each other so that no induction current may flow therebetween. They are spaced apart by a distance of at least several millimeters. A distance which is as large as about 50 mm is preferred to ensure that no induction current flow from the upper to the lower tube. The upper and lower tubes define a tubeless gas passageway portion therebetween. The position of the tubeless portions of the gas passageways depends on various factors, such as the shape of the plug, the type and quality of the refractory material and the amount of the gas to be blown through the plug. In order to prevent the flow of an induction current until the plug is changed, it is necessary that the bottom of a depression resulting from the wear of the refractory material should not reach the tubeless portion of any gas passageway. Although the plug does not always get worn in the same pattern, it is generally true that if it is worn to form a depression having a depth of, say, 150 to 200 mm, the stamped bottom wall of the furnace surrounding it begins to be affected and have a shortened life. Therefore, if the slag or metal layer adhering to the stamped bottom wall protects it against any substantial wear, it is necessary to change the plug before it has a worn depth of 150 to 200 mm. It is advisable that the tubeless portions of the gas passageways be located at a distance of at least 150 to 200 mm from the inner or working surface of the plug, or as close to the gas distributing chamber as possible.

If no satisfactory electrical insulation can be achieved between the upper and lower tubes or between the tubes of the adjoining gas passageways, it is effective to coat the outer peripheral or end surfaces of the tubes with an electrically insulating material. The spray coating of a fine ceramic powder is, for example, recommended.

The refractories of high quality, such as MgO-C, are expensive. Among the various portions of the plug, it is only the portion including the working surface that is essentially required to have a higher refractoriness. Therefore, it may be sufficient to use the refractories of high quality for only the portion including the working surface, while the remaining portions of the plug which are remote from the working surface are formed from refractories of low quality which are less expensive.

The tubes defining each gas passageway are longitudinally spaced apart from each other and are thereby electrically isolated from each other. Therefore, no induction current flows through the plug when an electric current is caused to flow, for example, through a molten metal in an electric furnace.

The plug according to one aspect of this invention will now be described more specifically with reference to FIGS. 1 to 4. Referring first to FIG. 1, there is shown a frustoconical plug 2 formed from a refractory material and having a very gradually tapered outer peripheral surface. It can be fitted in the bottom wall of a furnace, not shown, so as to extend between a gas distributing chamber 1 and the interior of the furnace. The plug 2 has a plurality of gas passageways 3 extending from the gas distributing chamber 1 to the inner or working surface of the plug facing the interior of the furnace. Each gas passageway 3 is provided with an upper tube 4 having an upper or inner end located in the working surface of the plug 2 and a lower tube 4' having a lower or outer end connected to the gas distributing chamber 1. The upper and lower tubes 4 and 4' are longitudinally spaced apart from each other and define a tubeless gas passageway portion therebetween. The upper tube 4 is considerably longer than the lower tube 4' and the tubeless portion is, therefore, located considerably close to the gas distributing chamber 1. All of the upper tubes 4 are of the same length and all of the lower tubes 4' are also of the same length. The tubes may, for example, be formed from a commercially available stainless steel tube having a minimum inside diameter of 0.8 to 1.0 mm.

Figure 2A:
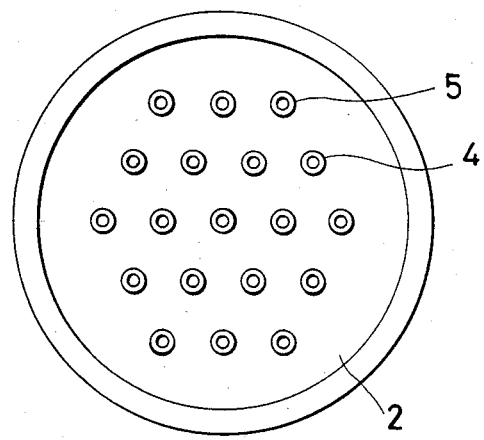
FIGS. 2A to 2D are top plan views showing by way of example different arrangements of gas passageways and tubes.
Figure 2B:
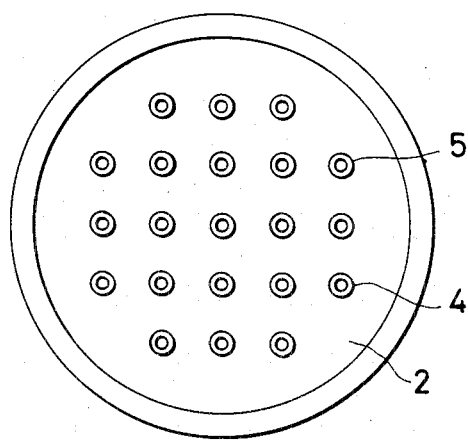
Figure 2C:
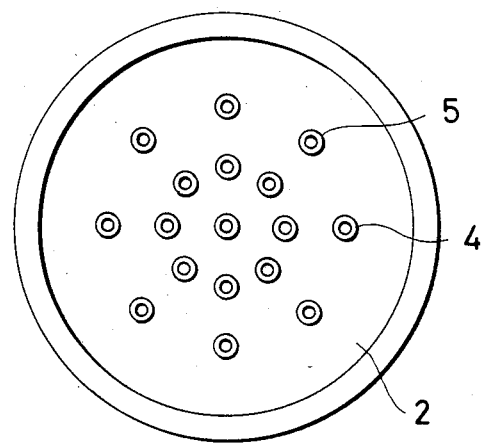
Figure 2D:
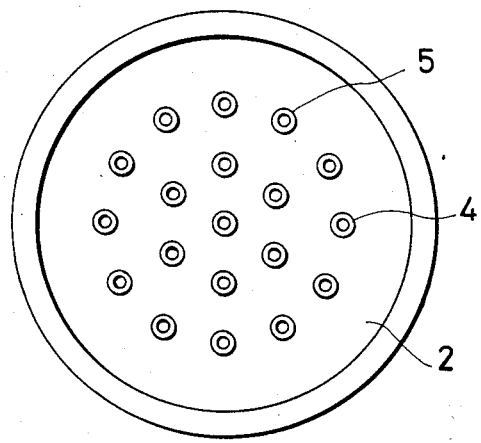

Referring to the cross-sectional arrangement of the gas passageways 3 and the tubes 4 and 4', several patterns are shown by way of example in FIGS. 2A to 2D. FIG. 2A shows every three adjoining gas passageways or tubes as basically defining a regular triangle. FIG. 2B shows a pattern defining a lattice. FIG. 2C shows a concentric and radial pattern. FIG. 2D shows a pattern which is concentric, but not exactly radial. There is no particular limitation to the arrangement of the gas passageways and tubes, though it is preferable that they be distributed as uniformly as possible across the cross section of the plug. Each gas passageway 3 has a gas outlet 5 formed at the upper end of the upper tube 4.

The foregoing statement relating to the arrangement of the gas passageways and tubes will also apply to all of the other embodiments or modifications of this invention that will hereinafter be described. Although it may be preferable to employ as many gas passageways as possible from the standpoint of gas distribution into the furnace, it is practically impossible to provide more than a certain number of gas passageways, as it gives rise to the problems which have already been pointed out. Under these circumstances, it may be appropriate to provide such a number of gas passageways as will enable them to be spaced apart from one another by a distance of, say, 5 to 100 mm, or preferably, say, 10 to 50 mm, so that it may be possible to make a plug which is satisfactorily filled with a refractory material including the aggregate.

Figure 3:
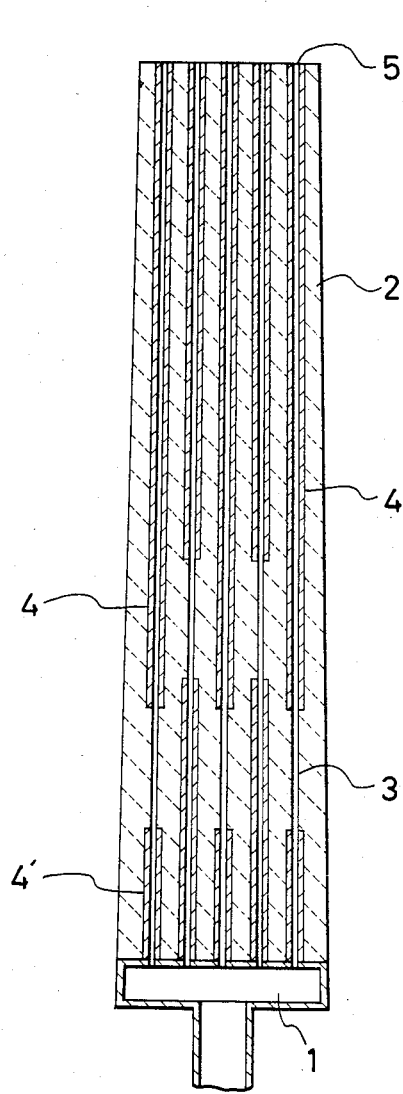
FIG. 3 is a longitudinal sectional view of a plug according to another embodiment of this invention.
Figure 4:
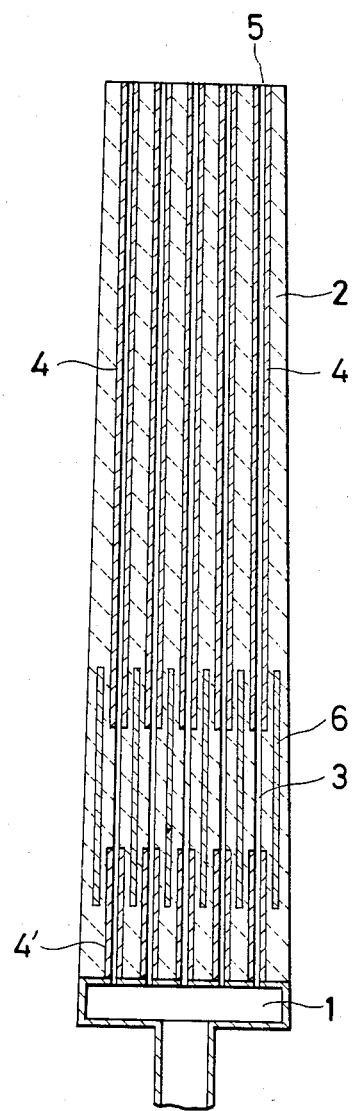
FIG. 4 is a longitudinal sectional view of a plug according to still another embodiment of this invention.

Two modified forms of the plug which has been described with reference to FIGS. 1 and 2A to 2D are shown in FIGS. 3 and 4, respectively. Like numerals are used to indicate like parts throughout FIGS. 1 to 4, so that no completely repeated description may be necessary. The plug 2 of FIG. 3 is characterized in that the tubeless portions between the upper and lower tubes 4 and 4' are located in an alternately staggered relation. This arrangement solves the problem of plug strength which may arise from the location of all the tubeless portions in the same position as shown in FIG. 1. The plug 2 of FIG. 4 is characterized by including a reinforcing member 6 provided between every two adjoining gas passageways 3 so that it may extend along the tubeless portions of the gas passageways 3 and overlap the mutually facing end portions of the upper and lower tubes 4 and 4'. Each reinforcing member 6 may, for example, comprise a stainless steel bar, strip or tube embedded in the refractory material. The reinforcing members 6 prevent any peeling or chipping of the refractory material even if it may crack.

According to another aspect of this invention, there is provided a plug having a plurality of gas passageways each defined at least partly by a tube which is formed from a nonconductive material. Each gas passageway is defined wholly or partly by an electrically insulating tube. If it is partly formed from an insulating tube, its remaining portion or portions can be formed from a tube or tubes of an electrically conductive material, such as stainless steel or any other appropriate metal.

The insulating tube may be formed from a nonconductive material or may alternatively comprise a tube of a conductive material having a surface coated with a nonconductive material. The nonconductive material may, for example, be selected from among ceramics including magnesia, alumina, zirconia, silicon carbide or nitride and sialon. If the insulating tube is a tube of a conductive material coated with an insulating layer of a nonconductive material, it is necessary to ensure that no electric current flow through the plug, even if the insulating layer may be damaged by the molten metal in the furnace.

If each gas passageway is defined by an insulating tube and a conductive tube or tubes, the conductive tube or tubes preferably have a relatively small inside diameter which is equal to the inside diameter of the insulating tube. The insulating tube may be connected, for example, between two longitudinally spaced apart conductive tubes in coaxial relation therewith. The plug of the type as described in the immediately preceding sentence can be manufactured by a method which will hereinafter be described by way of example.

A plurality of conductive tubes are each cut in two lengths to form an upper conductive tube and a lower conductive tube. The lower conductive tubes which have thereby been prepared are joined at their lower ends to a housing defining a gas distributing chamber by an ordinary method such as welding, screwing or caulking. A plurality of insulating tubes are joined to the upper ends of the lower conductive tubes, respectively. Each of the upper conductive tubes is joined at its lower end to one of the insulating tubes. Each insulating tube may have an outside diameter which is somewhat larger than that of the conductive tubes, and may, therefore, have a pair of ends recessed for receiving the mutually facing ends of the upper and lower conductive tubes, respectively. The conductive and insulating tubes which have been joined together are lined with a refractory material, such as MgO-C, MgO, MgO-Cr$_2$O$_3$, MgO-chromite or high alumina.

If each gas passageway is defined solely by an insulating tube, it is important that the tube must be formed from a nonconductive material which is hardly affected by any molten metal contacting it. In this case, the plug can, for example, be manufactured if a plurality of insulating tubes which are substantially equal in length to the plug to be manufactured are joined at their lower ends to a housing defining a gas distributing chamber, while their upper ends are arranged in a plane defining the working surface of the plug, and the outer surface of the insulating tubes are lined with a refractory material.

In case each gas passageway is defined by a conductive tube or tubes and an insulating tube, the insulating tube can be located in any position along the length of the plug if it is formed from a nonconductive material which is hardly affected by any molten metal contacting it. If the nonconductive material is likely to be affected by the molten metal contacting it, however, it is essential that the insulating tube be so positioned that no molten metal may contact it even if the plug may have got worn along its length. In other words, the insulating tube needs to be so positioned that its upper or inner end may stay at a distance from the bottom of any depression resulting from the wear of the plug. It is impossible to specify the position of the insulating tube definitely, since the rate at which the plug is worn depends on various factors including its shape, the type and quality of the refractory material employed and the amount of the gas which is blown therethrough. However, it is generally true that if the plug gets worn to form a depression having a depth of, say, 150 to 200 mm, the stamped bottom wall of the furnace surrounding it begins to have a shortened life, and that insofar as the slag or metal layer adhering to the stamped bottom wall protects it against any substantial wear, the plug needs to be changed or repaired before it has a worn depth of, say, 150 to 200 mm. Therefore, it is advisable to position the insulating tubes near the gas distributing chamber and at a distance of at least 150 to 200 mm from the working surface of the plug.

The plug which has now been described has a plurality of gas passageways each defined at least partly by a tube of a nonconductive material. Therefore, no electric current flows through the plug during, for example, the steelmaking operation in an electric arc furnace. Moreover, the refractory material of the plug is isolated from the gas flowing through the gas passageways and is, therefore, free from any damage by the gas, even if it may be a corrosive gas.

In any other respect, the plug is substantially identical to the plug which has been described with reference to FIGS. 1 and 2A to 2D. No repeated description is made of any identical or similar feature. The plug will now be described more specifically with reference to FIGS. 5 to 7 by way of example.

Figure 5:
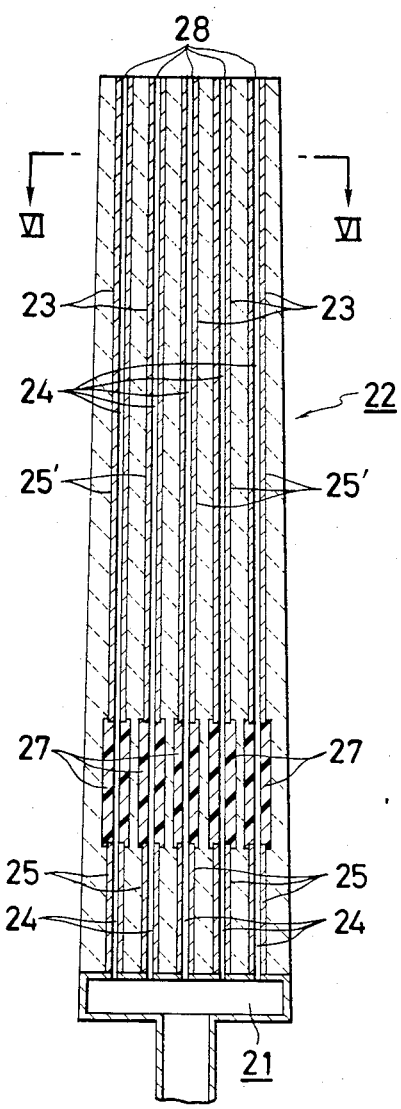
FIG. 5 is a longitudinal sectional view of a plug according to still another embodiment of this invention.

The plug 22 has a plurality of gas passageways 23 extending from a gas distributing chamber 21 to the working surface of the plug which will face the interior of a furnace. Each gas passageway 23 is provided with a lower conductive tube 25 having a lower end joined to a housing defining the gas distributing chamber 21 and an upper conductive tube 25 $\propto$ having an upper end defining a gas outlet 28 located in the working surface of the plug 22. Each of the conductive tubes 25 and 25' is formed from a conductive material, such as stainless steel, and has an axial bore 24 defining the gas passageway. Each conductive tube preferably has a small outside diameter and a small inside diameter, e.g., an outside diameter of 2.5 mm and an inside diameter of 1.0 mm. Each gas passageway 23 is further provided with an insulating tube 27 formed from a ceramic or other nonconductive material and connected between the conductive tubes 25 and 25' in coaxial relation therewith. The insulating tube 27 has an inside diameter which is equal to that of the conductive tubes and an outside diameter which is somewhat larger than that of the conductive tubes. The insulating tube 27 has a pair of ends 26 and 26' recessed for receiving therein the upper end of the lower conductive tube 25 and the lower end of the upper conductive tube 25', respectively, as shown in FIG. 7. The upper conductive tubes 25' are considerably longer than the lower conductive tubes 25 and the insulating tubes 27 are, therefore, located close to the gas distributing chamber 21. Although FIG. 5 shows all of the insulating tubes 27 as being located at the same level of height, it is also possible to position them at different levels of height.

According to another aspect of this invention, there is provided a plug reinforced longitudinally with a plurality of metal wires which do not continuously extend from one end thereof to the other, or a mass of nonconductive mineral fibers, while each gas passageway has a bare refractory wall, i.e., is not provided with any conductive or nonconductive tube. The plug has a very high degree of strength and as it does not include any conductive material extending continuously from one end thereof to the other, no electric current can flow through the plug during, for example, the steelmaking operation in an electric furnace. Moreover, the plug can be manufactured at a low cost, as the metal wires and the mineral fibers are both inexpensive.

Figure 8:
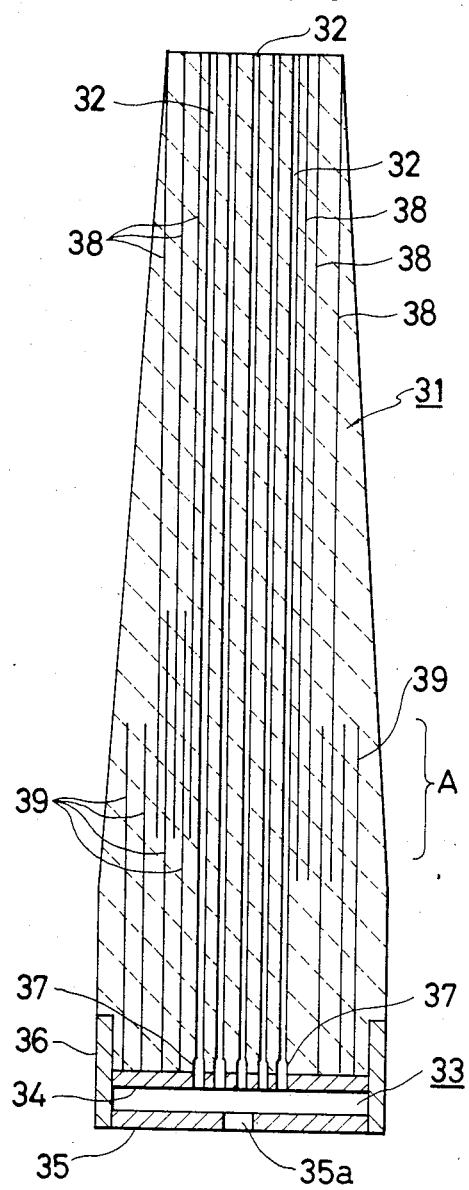
FIG. 8 is a longitudinal sectional view of a plug according to still another embodiment of this invention.

The plug which has been described in the immediately preceding paragraph is shown by way of example in FIG. 8. The plug 31 has a plurality of longitudinally extending parallel gas passageways 32 extending from a gas distributing chamber 33 to the working surface which will face the interior of a furnace. The gas distributing chamber 33 is defined by a first bottom plate 34 supporting thereon a refractory material forming the plug 31, a second bottom plate 35 spaced below the first bottom plate 34 and a cylindrical member 36 surrounding the bottom plates 34 and 35. The first bottom plate 34 has a plurality of openings each aligned with one of the gas passageways 32 and a plurality of short tubes 37 each fitted in one of the openings and projecting upwardly from the bottom plate 34. The short tubes 37 are provided for connecting the gas passageways 32, respectively, with the gas distributing chamber 33. The second bottom plate 35 has a gas inlet 35a.

The plug 31 includes a plurality of longitudinally extending reinforcing metal wires embedded in the refractory material. The metal wires consist of a first set of metal wires 38 extending from the working surface of the plug 31 to an intermediate portion thereof and a second set of metal wires 39 extending from the bottom of the plug 31 to its intermediate portion.

The plug 31 has an outer surface contour which changes from cylindrical to frustoconical in its intermediate portion A. The first and second sets of metal wires 38 and 39 overlap each other in the intermediate portion A, but do not contact each other. The metal wires 38 and 39 are appropriately spaced apart from each other and are, therefore, electrically isolated from each other. If the metal wires 38 and 39 have too large a spacing from each other in the area A, however, it is impossible to position a sufficient number of wires 38 and 39 for achieving a satisfactory reinforcing effect. Therefore, the metal wires 38 and 39 are spaced apart from each other by a distance of, say, 5 to 15 mm, or preferably, say, 8 to 12 mm. The metal wires 38 per se and the metal wires 39 per se are preferably spaced apart by the distance which has been stated in the immediately preceding sentence.

Although there is no absolute limitation to the position of the intermediate portion A in which the metal wires 38 and 39 overlap each other, it is advisable from the standpoint of wire arrangement that it is a plug portion having a relatively large diameter. The intermediate portion A needs not always to be a small area having a limited height, but may alternatively be a prolonged area in which the metal wires 38 and 39 overlap each other at different levels of height. This alternative arrangement produces a still better reinforcing result.

Each of the metal wires 38 and 39 is preferably a stainless steel wire or a wire of any other heat and corrosion resistant steel. It may be a single wire or a twisted wire. While its cross-sectional area depends on the number of the wires which are embedded in the plug, it is usually in the range of, say, 1 to 20 $mm^2$ and preferably in the range of, say, 3 to 7 $mm^2$. It is effective to coat the surfaces of the metal wires 38 and 39 with a nonconductive ceramic material or the like in order to improve their electrical insulation from each other. Metal wires are also provided between every two adjoining gas passageways 32, though they are not shown in FIG. 8. It is possible to achieve still better reinforcing results if each wire is provided with a plurality of spaced apart knots or projections. The knots or projections improve the anchoring of the metal wires in the refractory material.

Figure 10:
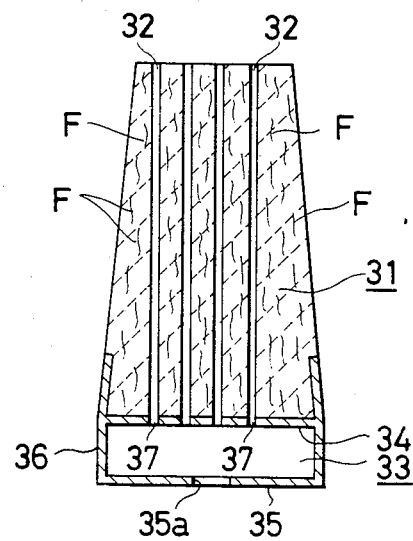
FIG. 10 is a longitudinal sectional view showing a modified form of the plug shown in FIG. 8.

Attention is now directed to FIG. 10 showing a modified form of the plug shown in FIG. 8. The plug 31 is reinforced with nonconductive mineral fibers F, instead of the metal wires. Insofar as the fibers F are nonconductive, no induction current flows through the fibers F. Therefore, the fibers F may continuously extend through the entire length of the plug, or may alternatively comprise a plurality of groups of short fibers which are spaced apart from one another along the length of the plug. The plug can be formed from any conventionally available refractory material if it has a satisfactorily high degree of resistance to corrosion by a molten metal. The fibers can be selected from among various kinds of nonconductive mineral fibers. Fibers of $Al_2O_3$, $Al_2O_3$-$SiO_2$, $Al_2O_3$-$Cr_2O_3$ or $ZrO_2$ are, among others, preferred.

Figure 9:
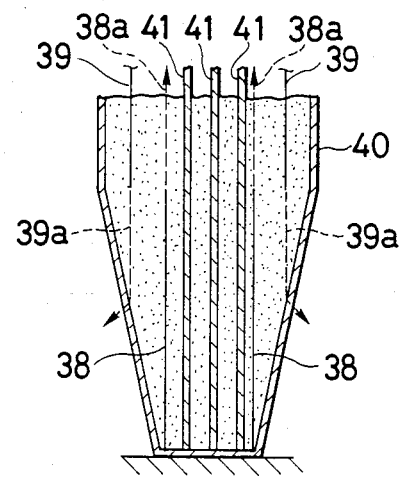
FIG. 9 is a longitudinal sectional view showing a method of manufacturing the plug shown in FIG. 8.

The plug shown in FIG. 8 can be manufactured by a method which will now be described by way of example with reference to FIG. 9. A plurality of elongated cores 41 each in the form of a bar are vertically disposed in a frame 40 having the shape of an inverted plug. They are disposed in a horizontally juxtaposed array in which the gas passageways 32 should be arranged. The metal wires 38 and 39 are also vertically disposed in the frame 40 in their appropriate patterns. Each wire has one end to which a string 38a or 39a of a synthetic resin or like material is fastened. The strings 38a and 39a are pulled to stretch the metal wires 38 and 39, respectively. The pattern 40 has a sidewall provided with a plurality of apertures. Each string 39a is pulled out through one of the apertures at its free end. Each string 38a has its free end located above the top of the frame 40. A kneaded refractory material is poured into the frame 40. When the frame 40 has been filled with the refractory material, the strings 38a and 39a are strongly pulled so that they may be detached from the metal wires 38 and 39, respectively. The strings 38a and 39a are removed from the frame 40 to leave the metal wires 38 and 39 alone in the refractory material. That portion of each metal wire 39 which projects from the refractory material is cut away. Then, the housing comprising the bottom plates 34 and 35 and the cylindrical member 36 and defining the gas distributing chamber is placed on the top of the frame 40 and several ordinary steps including curing and frame removal are followed to yield an integral plug assembly including the housing for defining the gas distributing chamber.

Figure 11:
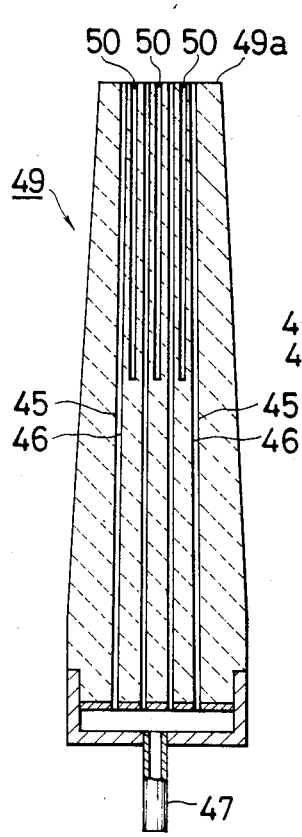
FIG. 11 is a longitudinal sectional view of a plug according to still another embodiment of this invention.
Figure 12:
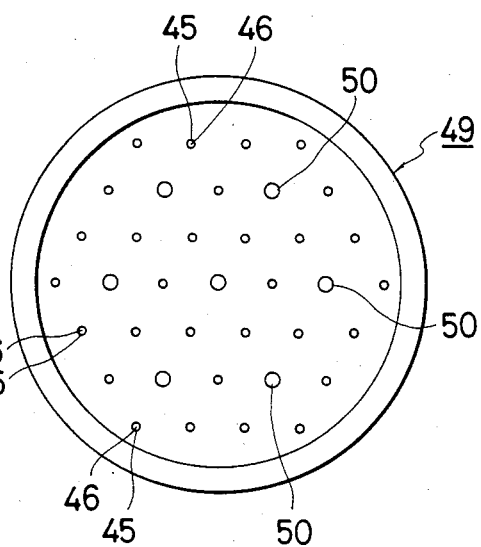
FIG. 12 is an enlarged top plan view of the plug shown in FIG. 11.

According to still another aspect of this invention, there is provided a plug having a plurality of elongated holes each provided between every two adjoining gas passageways in parallel relation thereto and extending from the working surface of the plug which will face the interior of a furnace to an intermediate portion thereof. The plug is shown by way of example in FIGS. 11 and 12. The plug 49 has a plurality of longitudinally extending gas passageways 46 each defined by a thin tube 45 of a metal, such as stainless steel, embedded in a refractory material. The plug 49 also has a plurality of elongated holes 50 each having a small diameter and formed in the refractory material between every two adjoining gas passageways 46 in parallel relation thereto. The holes 50 extend from the working surface 49a of the plug 49 to an intermediate portion thereof. They do not extend through the entire length of the plug 49, as opposed to the gas passageways 46.

Figure 13:
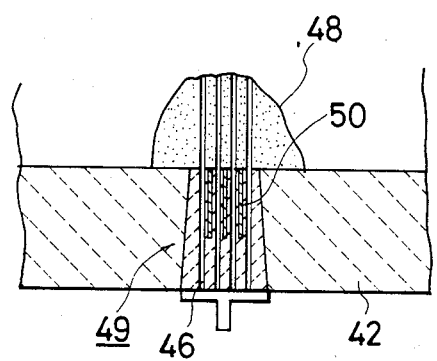
FIG. 13 is a reduced longitudinal sectional view showing the plug of FIG. 11 installed in the bottom wall of a vessel.
Figures 14, 15:
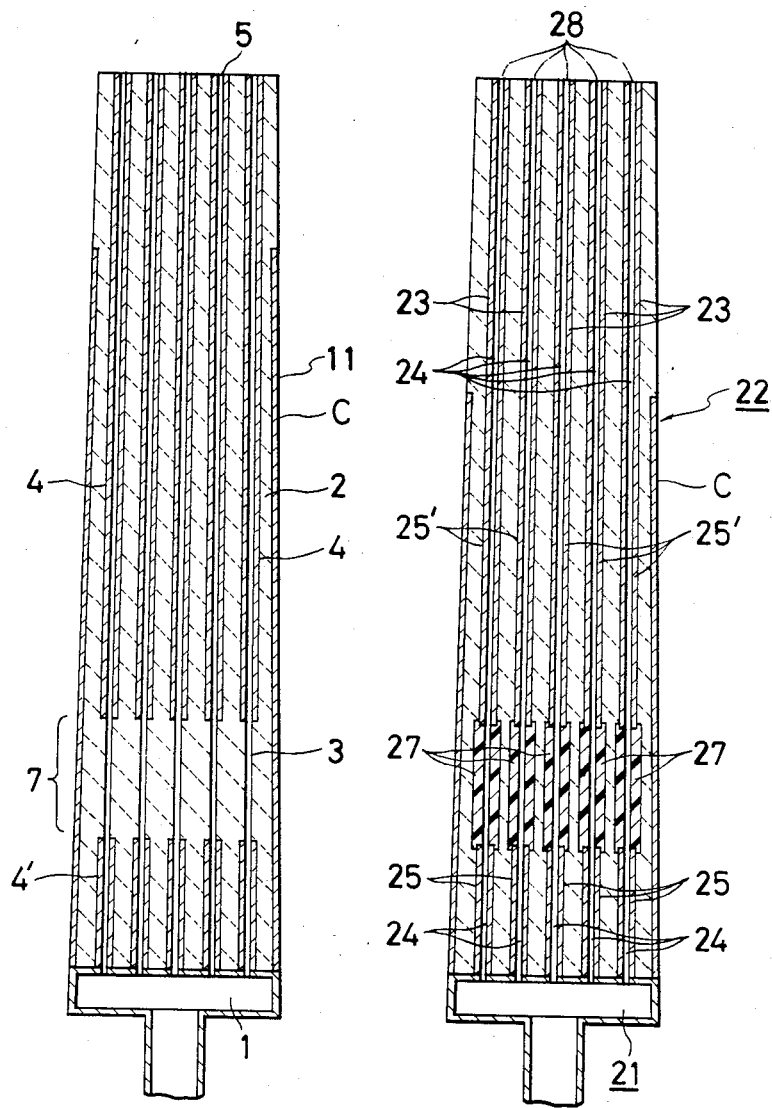

FIG. 13 shows a portion of the bottom wall 42 of a furnace in which the plug 49 is installed for blowing gas into a molten metal through the gas passageways 46. As the refining operation proceeds, the molten metal enters the holes 50, solidifies and eventually forms a mushroom-shaped metal layer 48 adhering to the inner end of the plug 49 and its vicinity, as shown in FIG. 13. It is apparent that the metal in the holes 50 forms a solid base for the mushroom-shaped layer 48. The holes 50 must, therefore, have such a depth that even if the plug 49 may be worn to a permissible extent, they may still be capable of retaining a satisfactory amount of metal and thereby maintaining a sound base for the mushroom-shaped layer 48 until the plug 49 is changed.

The holes 50 preferably have a diameter of, say, 1 to 5 mm. If their diameter is too small, they fail to provide a sound base for any such mushroom-shaped layer. If their diameter is too large, they receive so large an amount of molten metal therein that the plug 49 has an undesirably elevated temperature and thereby an unduly shortened life. The holes 50 may have a circular or a square or rectangular cross section. The holes 50 can, for example, be made if a corresponding number of metal wires each having an appropriate diameter are temporarily embedded in the refractory material during the manufacture of the plug.

The plug 49 was made for an experimental purpose by using the following tubes 45 defining the gas passageways 46 and the following holes 50 were made therein:

Tubes

Inside diameter: 1 mm
Length: 753 mm
Number: 30

Holes

Diameter: 5 mm
Depth: 350 mm
Number: 7

The plug 49 was installed in the bottom wall of an electric steelmaking furnace. An inert gas was blown into a molten metal in the furnace through the tubes 45. A sufficiently large mushroom-shaped metal layer 48 was formed over the top of the plug 49 and contributed to prolonging its life. Each gas passageway was defined by two stainless steel tubes 45 and a ceramic tube connected therebetween for preventing the flow of any induction current through the plug. It is obvious that the holes 50 facilitated the formation of an effective mushroom-shaped metal layer contributing to prolonging the life of the plug and the bottom wall portion surrounding it.

Attention is now directed to FIGS. 14 to 17 showing modified forms of the plugs which have been described with reference to FIGS. 1, 5, 8 and 11, respectively. The modifications reside in the inclusion of an outer casing which is formed from a metal or a layer of a refractory paint composed of, for example, aluminum phosphate. The outer casing is shown at C in each of FIGS. 14 to 17 and surrounds the refractory material to protect it against any damage even if a large mechanical force may bear on it during the storage, transportation or installation of the plug. The outer casing C terminates in an intermediate portion of the plug without reaching as far as its upper end, so that it may not form a shortcircuit for any induction current during the operation of an electric furnace. It preferably has such a length that it may surround the refractory material along only up to a maximum of 80% of the plug length. In any other respect, the plugs are identical to those shown in FIGS. 1, 5, 8 and 11, respectively. Like numerals are used to indicate like parts in both of each corresponding pair of figures and no repeated description is made of any common feature. Notwithstanding the foregoing statement, the outer casing may advantageously extend along the whole length of the plug if it is formed from a layer of a refractory paint.

According to this invention, the plug may comprise two portions which are composed of different kinds of refractory materials. They are an inner portion adapted for facing the interior of a furnace in which the plug will be provided and an outer portion adjoining a gas distributing chamber. The inner portion is formed from a refractory material of high quality having a high degree of wear resistance, such as MgO-C, and the outer portion is formed from a refractory material of low quality which is less expensive. This construction is applicable to all of the plugs which have already been described, too. Moreover, that part of the bottom wall of the furnace which surrounds the plug can also be constructed in a similar way. Its inner portion, which faces the interior of the furnace, may be formed from a refractory material of high quality, and its outer portion from one of low quality.

The term "refractory material of high quality" as herein used means any refractory material having a high degree of fracture resistance, including MgO-C and any other refractory material that has hitherto been used for constructing a plug for a furnace. The term "refractory material of low quality" as herein used means MgO brick or any other refractory material of the grade which is less expensive, and which is inferior in fracture resistance to any refractory material of high quality, but is still so strong that the destruction of the plug as a whole is unlikely to occur.

The preferred thickness of each portion depends on various factors including the shape of the furnace and the type of gas which is blown thereinto through the plug. It is, however, usually sufficient that the inner portion, which is formed from a refractory material of high quality, has a thickness of, say, 150 to 200 mm. To be on the safe side, it is, of course, possible to increase its thickness, though an economical factor may also have to be considered.

Two methods can, for example, be employed for making the plug which has been described in several immediately preceding paragraphs. According to the first method, a refractory material of high quality and a refractory material of low quality are placed in a frame to form the inner and outer portions, respectively, of a plug simultaneously. Then, a plurality of holes are made through the refractory materials and a tube or tubes defining a gas passageway is inserted into each of the holes. Alternatively, it is possible to place a plurality of appropriately disposed tubes in the frame and thereafter fill it with the refractory materials. After the frame has been filled with the refractory materials, the tubes are removed therefrom if they have been employed to form gas passageways each having a bare refractory wall. The plug which has been made is installed in the bottom wall of a furnace.

According to the second method, a refractory material of high quality is placed in the inner portion of a plug opening formed in the bottom wall of a furnace and a castable refractory material of low quality is, then, poured or blown into the outer portion of the plug opening.

Figure 18:
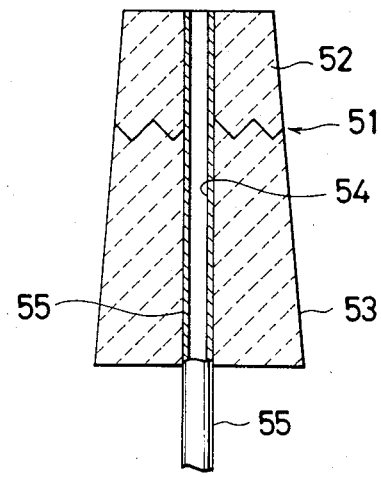
Figure 19:
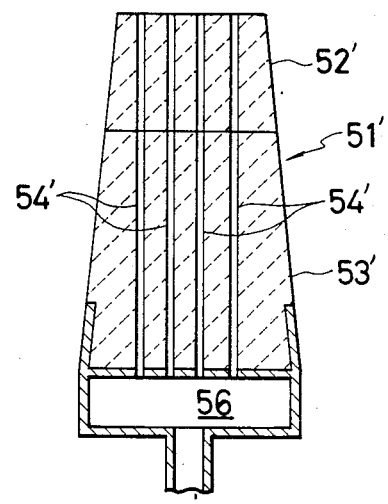

Two plugs of the type which has been described in several immediately preceding paragraphs are shown by way of example in FIGS. 18 and 19, respectively. The plug 51 shown in FIG. 18, which is frustoconical and has a gradually tapered outer peripheral surface, comprises an upper or inner portion 52 composed of a refractory material of high quality, such as MgO-C, and a lower or outer portion 53 composed of a refractory material of low quality, such as MgO. The two portions 52 and 53 contact each other intimately and the mutually contacting surfaces thereof are corrugated. The plug 51 is axially provided with a gas passageway 54 having a relatively large diameter. The gas passageway 54 is defined by a tube 55 of stainless steel or like material.

The plug 51' shown in FIG. 19, which is also frustoconical and has a gradually tapered surface, also comprises an upper or inner portion 52' composed of a refractory material of high quality, such as MgO-C, and a lower or outer portion 53' composed of a refractory material of low quality, such as MgO. The two portions 52' and 53' contact each other intimately and the mutually contacting surfaces thereof are flat and horizontal. The plug 51' has a plurality of gas passageways 54' each having a small diameter. Each gas passageway 54' has a lower end connected with a gas distributing chamber 56.

Figure 20:
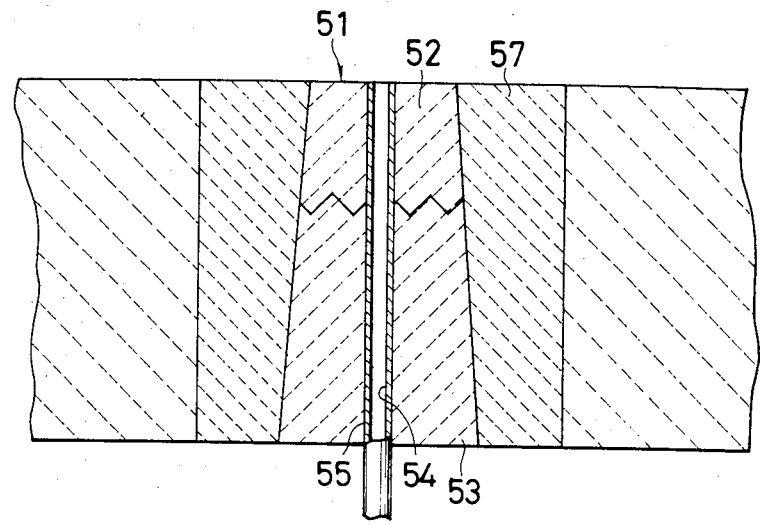
FIGS. 20 and 21 are fragmentary longitudinal sectional views each showing the bottom wall of an electric furnace in which the plug of this invention is installed.
Figure 21:
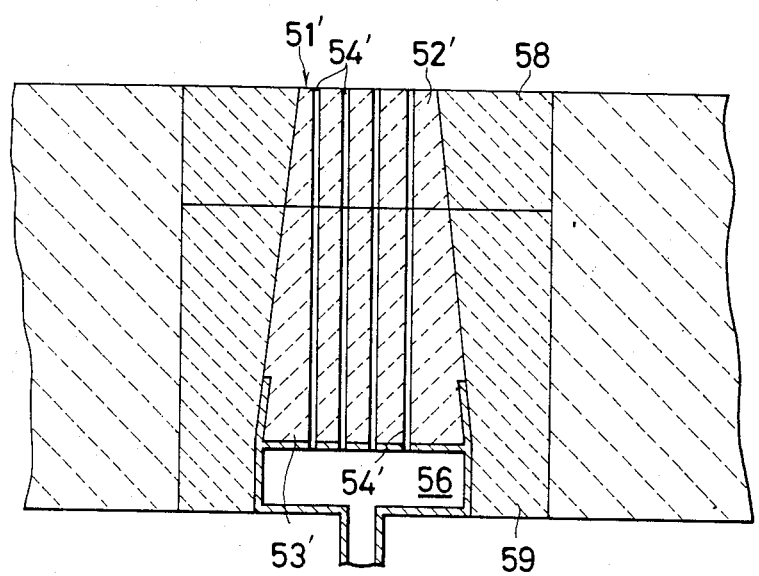

FIG. 20 shows the plug 51 of FIG. 18 as installed in the bottom wall of an electric furnace by way of example. The plug 51 is surrounded by a layer 57 of, say, a castable refractory material. FIG. 21 shows the plug 51' of FIG. 19 as installed in the bottom wall of an electric furnace by way of example. The plug 51' is surrounded by two layers 58 and 59 of refractory materials. The upper or inner layer 58 is, for example, of a castable refractory material of high quality and the lower or outer layer 59 may comprise a refractory material of low quality which is less expensive. The arrangement shown in FIG. 21 is useful for improving the corrosion resistance of the plug and its vicinity at a relatively low cost.

The plug does not always need to be an assembly of specifically shaped bricks, but can alternatively be composed solely of castable refractories. The latter type of plug may comprise an inner portion composed of a castable refractory material of high quality and an outer portion composed of a castable refractory material of low quality. A plurality of tubes may be embedded in the refractory materials to form the necessary gas passageways.

Description will now be made of some specific examples of plugs which were used in a 50 ton electric furnace having a stamped bottom wall thickness of 700 mm. They were of the type shown in FIG. 18. One of the plugs had an inner portion having a thickness of 250 mm and composed of MgO-C and an outer portion having a thickness of 450 mm and composed of MgO. The tubes were set in position and the refractory materials were poured to form the plug. When the operation of the furnace had been repeated for about 400 heats, the plug had a worn depth of about 100 mm and was changed to a new one. Although the conventional plugs had also been usable for about 400 heats, the cost of the plug according to this invention was as low as about 40% of that of any conventional plug.

Another plug according to this invention had an inner portion having a thickness of 250 mm and composed of MgO-C and an outer portion having a thickness of 450 mm and composed of $Al_2O_3$. This plug also had a worn depth of about 100 mm and was changed when the operation of the furnace had been repeated for about 400 heats. The cost of the plug was as low as about 40% of that of any conventional plug.

The properties of the refractories used for the plugs which have been described in the two immediately preceding paragraphs are shown in TABLE 1. TABLE 2 shows by way of example several other combinations of refractories that are expected to produce similar results. Referring to TABLE 2, if MgO-C is used for the inner portion of any plug, the use of MgO-C for its outer portion, too, fails to provide any economical advantage. Better results can be obtained if there is no large difference in coefficient of thermal expansion between the refractories used for the inner and outer portions of a plug.

TABLE 1

| | | Outer portion | |
|---|---|---|---|
| | Inner portion MgO—C | MgO | Castable high alumina |
| Chemical analysis % | MgO | 76 | 93 | — |
| | C | 19 | — | — |
| | $Al_2O_3$ | — | — | 95 |
| Apparent porosity (%) | | 2.8 | 9.5 | — |
| Bulk density | | 2.98 | 2.85 | — |
| Cold crushing strength (kg/cm²) | | 430 | 800 | 450* |
| Expansion (%) at 1000° C. | | 1.15 | 1.20 | — |

*When dried at 110° C. for 24 hours.

TABLE 2

| | | Inner portion | | | Outer portion | | |
|---|---|---|---|---|---|---|---|
| | | MgO—C | MgO—C | Spinel | MgO—dolomite | MgO—C | High alumina |
| Chemical analysis % | MgO | 76 | 75 | 24 | 70 | 75 | — |
| | C | 19 | 19 | — | — | 19 | — |
| | $Al_2O_3$ | — | — | 62 | — | — | 87 |
| | CaO | — | — | — | 18 | — | — |
| Apparent porosity (%) | | 2.8 | 3.1 | 16.0 | 5.5 | 3.1 | 16.0 |
| Bulk density | | 2.98 | 2.87 | 2.85 | 2.90 | 2.87 | 2.85 |
| Cold crushing strength (kg/cm²) | | 420 | 400 | 700 | 350 | 400 | 500 |
| Expansion (%) at 1000° C. | | 1.15 | 1.15 | 0.93 | 1.05 | 1.15 | 0.75 |
| Contains (o) electrically fused MgO clinker, or not (x) | | o | x | — | — | x | — |

If the refractory material of high quality is used only for the inner portion of the plug which is liable to wear, while its outer portion which is much less liable to wear is composed of a refractory material of low quality, the lower cost of the refractory material of low quality contributes to reducing the cost of the plug as a whole and thereby the maintenance cost of the bottom wall of a furnace in which the plug is installed, as is obvious from the foregoing description.

One or more plugs according to this invention may be provided in the bottom wall of an electric furnace which is prepared from a stamping material particularly of the dry type. A layer of fire bricks may be disposed between the plug and the stamping material. The stamping material is easy to mold, though it may be somewhat inferior to fire bricks in fire resistance. Therefore, it can advantageously be used for forming at least the middle portion of the bottom wall between its inner and outer surfaces in an area which is appropriately spaced apart from the plug. While the fire bricks surrounding the plug may not have to be comparable to the plug in fire resistance, they need to be superior to the stamping material in fire resistance. The layer of fire bricks which surrounds the or each plug preferably has a cross-sectional area of 0.4 to 1.2 m². While it may be possible to prepare a single brick, its preparation is difficult from the standpoint of dimensional accuracy and its installation is also difficult. Therefore, it is advisable to prepare a plurality of bricks and lay them along the plug. The use of fire bricks does not need to be limited to the area surrounding the plug, but can advantageously be extended to the inner and outer surfaces of any other portion of the bottom wall. It is particularly effective to cover the inner surface of the bottom wall with fire bricks to ensure the protection of the stamping material particularly in the vicinity of the plug.

Figure 22:
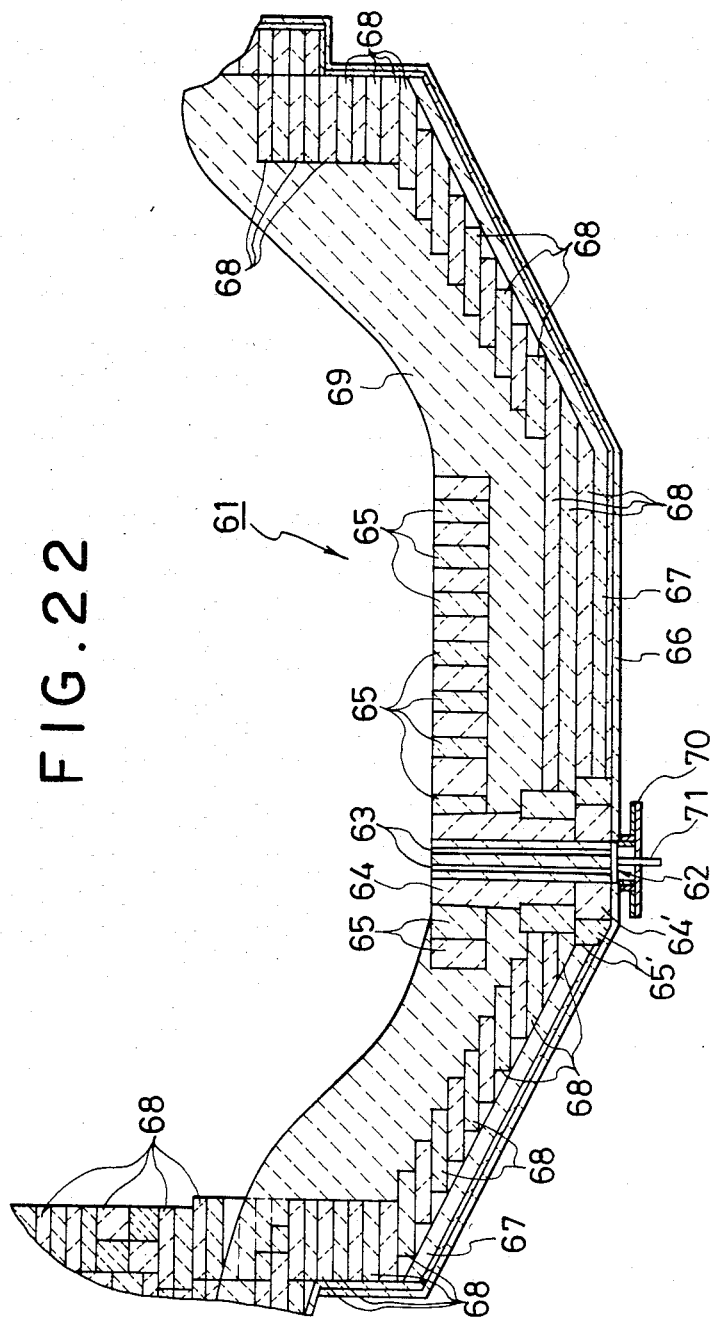
FIG. 22 is a longitudinal sectional view of another furnace bottom wall structure.
Figure 23:
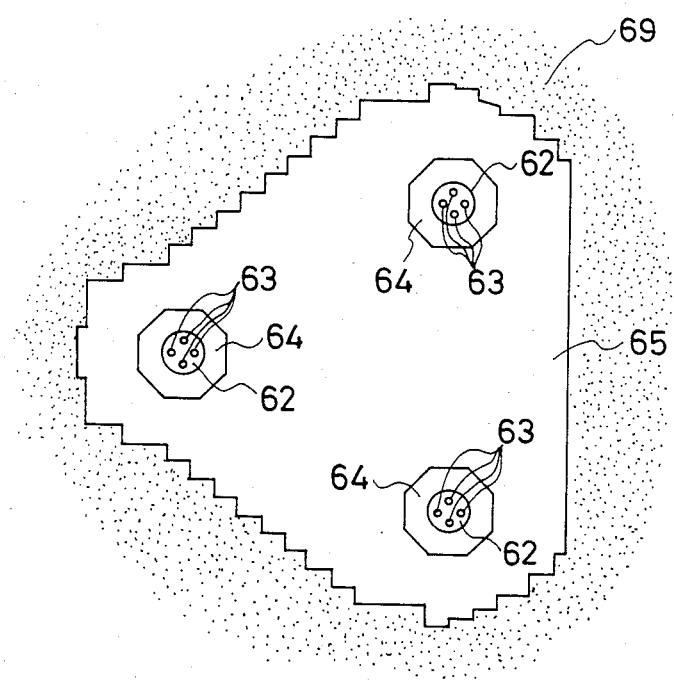
FIG. 23 is a fragmentary top plan view of the structure shown in FIG. 22.
Figure 24:
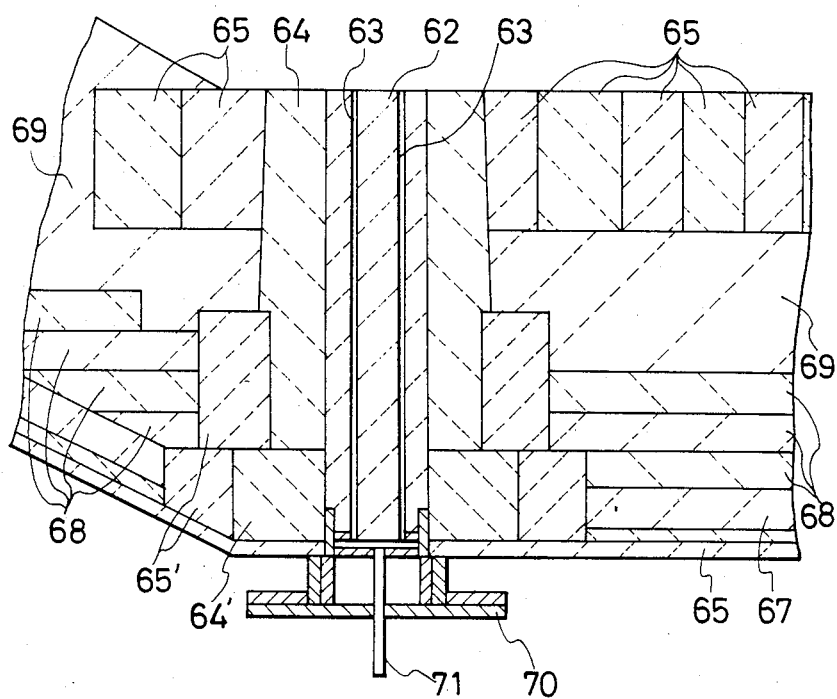
FIG. 24 is a fragmentary enlarged view of FIG. 22.

Reference is now made to FIGS. 22 to 24 showing by way of example the bottom wall of an electric furnace in which a plurality of plugs embodying this invention are provided. Three frustoconical plugs 62 each having a gradually tapered surface which slightly spreads downwardly are provided in the bottom wall 61. They are positioned in a regular triangular array, as shown in FIG. 23. Each plug 62 is formed from a refractory material of relatively high quality, such as MgO-C, and has a plurality of longitudinally extending gas passageways 63. Each plug 62 is surrounded by differently shaped fire bricks and a dry stamping material 69. The fire bricks include an upper brick 64 and a lower brick 64' which contact each plug 62 directly, and which define a cylindrical layer having a regular octagonal outer surface contour, as shown in FIG. 23. The fire brick 64 is preferably comparable or only slightly inferior in quality to the refractory material of the plug 62, as it is exposed to the gas which is blown through the plug.

Each of the three fire bricks 64 has an upper portion surrounded by the stamping material 69. A multiplicity of fire bricks 65 are laid along the inner surface of the bottom wall around each fire brick 64 and between every two adjoining fire bricks 64, though they are not individually shown in FIG. 23. Each upper fire brick 64 has a lower portion surrounded by a fire brick 65'. Each lower fire brick 64' is likewise surrounded by a fire brick 65'. The upper and lower fire bricks 65' are substantially of the same quality. The lower ends of the plug 62 and the fire brick 64' which are flush with each other rest on a steel plate 66 defining the outer surface of the bottom wall 61. A layer of a refractory filler or ordinary hearth bricks 67 is laid on the steel plate 66. Differently shaped bricks 68 are laid on the hearth bricks 67 around the upper and lower fire bricks 65 and 65'. The wall portions between the bricks 65 and 68 and around the bricks 65 are filled with the dry stamping material 69 which is separated from the plugs 62 mainly by the fire bricks 64. Each plug 62 is provided at its lower end with a handle 70 which can be gripped for installing the plug 62 in the bottom wall of the furnace or removing it therefrom. A conduit 71 is connected to the gas passageways 63 for supplying thereinto the gas to be blown into the furnace.

Figure 25:
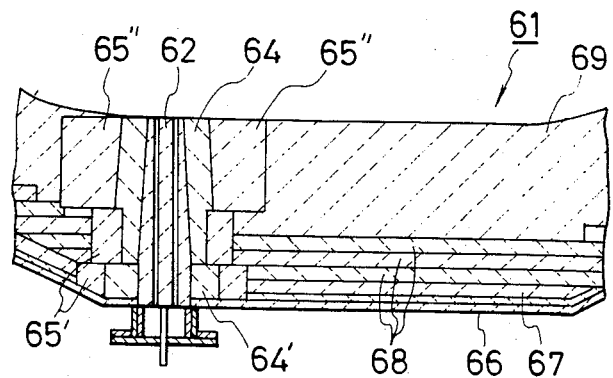
FIG. 25 is a fragmentary longitudinal sectional view of still another furnace bottom wall structure.
Figure 26:
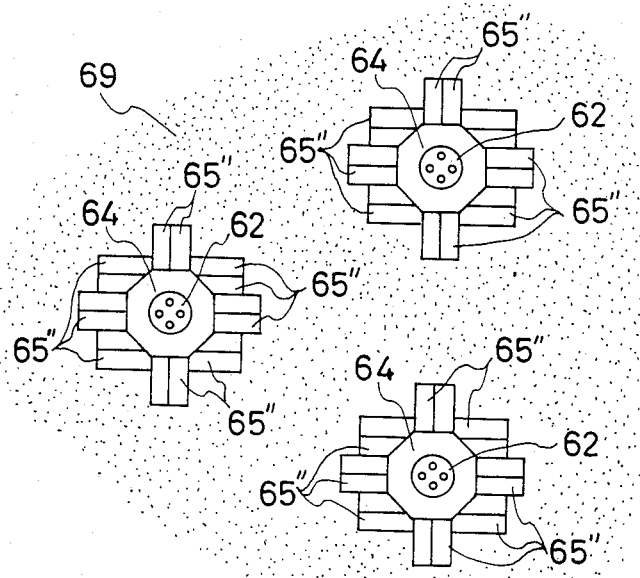
FIG. 26 is a top plan view of the structure shown in FIG. 25.

A modified bottom wall construction is shown in FIGS. 25 and 26. Each of three plugs 62 has an upper portion surrounded by a generally cylindrical fire brick 64 having a regular octagonal outer surface contour. The fire brick 64 has an upper portion surrounded by a total of 16 fire bricks 65" each having a rectangular cross section. The fire bricks 65" surrounding each plug 62 are surrounded by the dry stamping material 69.

Figure 27:
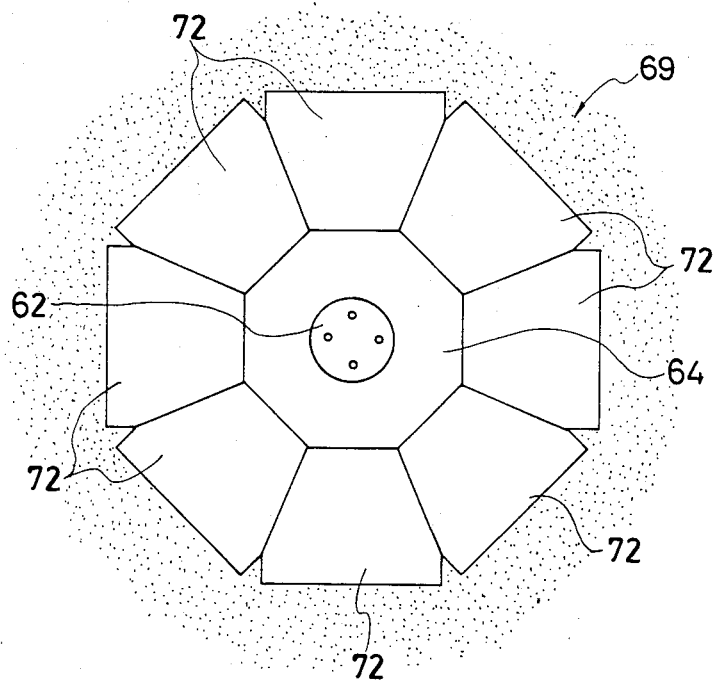
FIG. 27 is a fragmentary top plan view of still another furnace bottom wall structure.

Another modified construction is shown in FIG. 27. The fire brick 64 surrounding each plug 62 is surrounded by eight fire bricks 72 each having a generally trapezoidal cross section. The fire bricks 72 are surrounded by the dry stamping material 69.

The use of fire bricks between the plug and the stamping material forming the bottom wall of an electric furnace as hereinabove described contributes to prolonging the life of the stamped bottom wall, as they space it from the plug. The use of the stamping material can shorten the time which is required for constructing the furnace.

What is claimed is:

1. A plug for a refining apparatus comprising:
a refractory body having a plurality of longitudinally extending gas passageways through which gas can be blown into said apparatus; and
a plurality of metal tubes provided in each of said gas passageways and spaced apart from each other longitudinally of said gas passageway so that said tubes may be electrically isolated from each other.

2. A plug as set forth in claim 1, wherein said tubes define therebetween a tubeless gas passageway portion, said tubeless portions being differently positioned from one of said gas passageways to another as viewed longitudinally of the plug.

3. A plug as set forth in claim 1, wherein said tubes define a tubeless gas passageway portion therebetween and a reinforcing member is provided between said tubeless portion of each gas passageway and another gas passageway adjoining it or said tubes defining said adjoining gas passageway.

4. A plug as set forth in claim 1, wherein said body has an inner portion adapted for positioning adjacent to the interior of said apparatus and formed from a refractory material of high quality and an outer portion formed from a refractory material of low quality.

5. A plug as set forth in claim 1, further including a metal casing surrounding said body except a portion thereof adjacent to the interior of said apparatus.

6. A plug as set forth in claim 1, wherein said body is installed in the bottom wall of said apparatus which has a portion surrounding said body in close proximity thereto and formed from specifically shaped refractory materials and a portion remote from said body and formed from a stamping material.

7. A plug for a refining apparatus comprising:
a refractory body having a plurality of longitudinally extending gas passageways through which gas can be blown into said apparatus; and
a plurality of tubular means each provided in one of said gas passageways and formed at least partly from a nonconductive material which can prevent the flow of any induction current through the plug.

8. A plug as set forth in claim 7, wherein each of said tubular means comprises two electrically conductive tubes and an insulating tube formed from a nonconductive material and connected between said conductive tubes, said conductive and insulating tubes having a substantially equal inside diameter.

9. A plug as set forth in claim 7, wherein said body has an inner portion adapted for positioning adjacent to the interior of said apparatus and formed from a refractory material of high quality and an outer portion formed from a refractory material of low quality.

10. A plug as set forth in claim 7, further including a metal casing surrounding said body except a portion thereof adjacent to the interior of said apparatus.

11. A plug as set forth in claim 7, wherein said body is installed in the bottom wall of said apparatus which has a portion surrounding said body in close proximity thereto and formed from specifically shaped refractory materials and a portion remote from said body and formed from a stamping material.

12. A plug for an electric furnace comprising:
a refractory body having a plurality of longitudinally extending gas passageways each having a bare refractory wall;
said body being provided at its end remote from the interior of said furnace with a gas distributing chamber connected with said gas passageways; and
a material embedded in said body for reinforcing it, said material comprising a plurality of metal wires positioned in a discontinuous way longitudinally of said body or a mass of nonconductive mineral fibers.

13. A plug as set forth in claim 12, wherein said body has an inner portion adapted for positioning adjacent to the interior of said furnace and formed from a refractory material of high quality and an outer portion formed from a refractory material of low quality.

14. A plug as set forth in claim 12, further including a metal casing surrounding said body except a portion thereof adjacent to the interior of said furnace.

15. A plug as set forth in claim 12, wherein said body is installed in the bottom wall of said furnace which has a portion surrounding said body in close proximity thereto and formed from specifically shaped refractory materials and a portion remote from said body and formed from a stamping material.

16. A plug for a refining apparatus having a bottom wall provided with a gas blowing hole, said plug comprising a refractory body having a plurality of longitudinally extending gas passageways extending between the inner and outer surfaces of said bottom wall and a plurality of elongated holes extending in parallel to said gas passageways from said inner surface of said bottom wall to an intermediate portion of said body.

17. A plug as set forth in claim 16, wherein said body has an inner portion adapted for positioning adjacent to said inner surface of said bottom wall and formed from a refractory material of high quality and an outer portion formed from a refractory material of low quality.

18. A plug as set forth in claim 16, further including a metal casing surrounding said body except a portion thereof adjacent to said inner surface of said bottom wall.

19. A plug as set forth in claim 16, wherein said bottom wall has a portion surrounding said body in close proximity thereto and formed from specifically shaped refractory materials and a portion remote from said body and formed from a stamping material.

* * * * *